Figure 1:
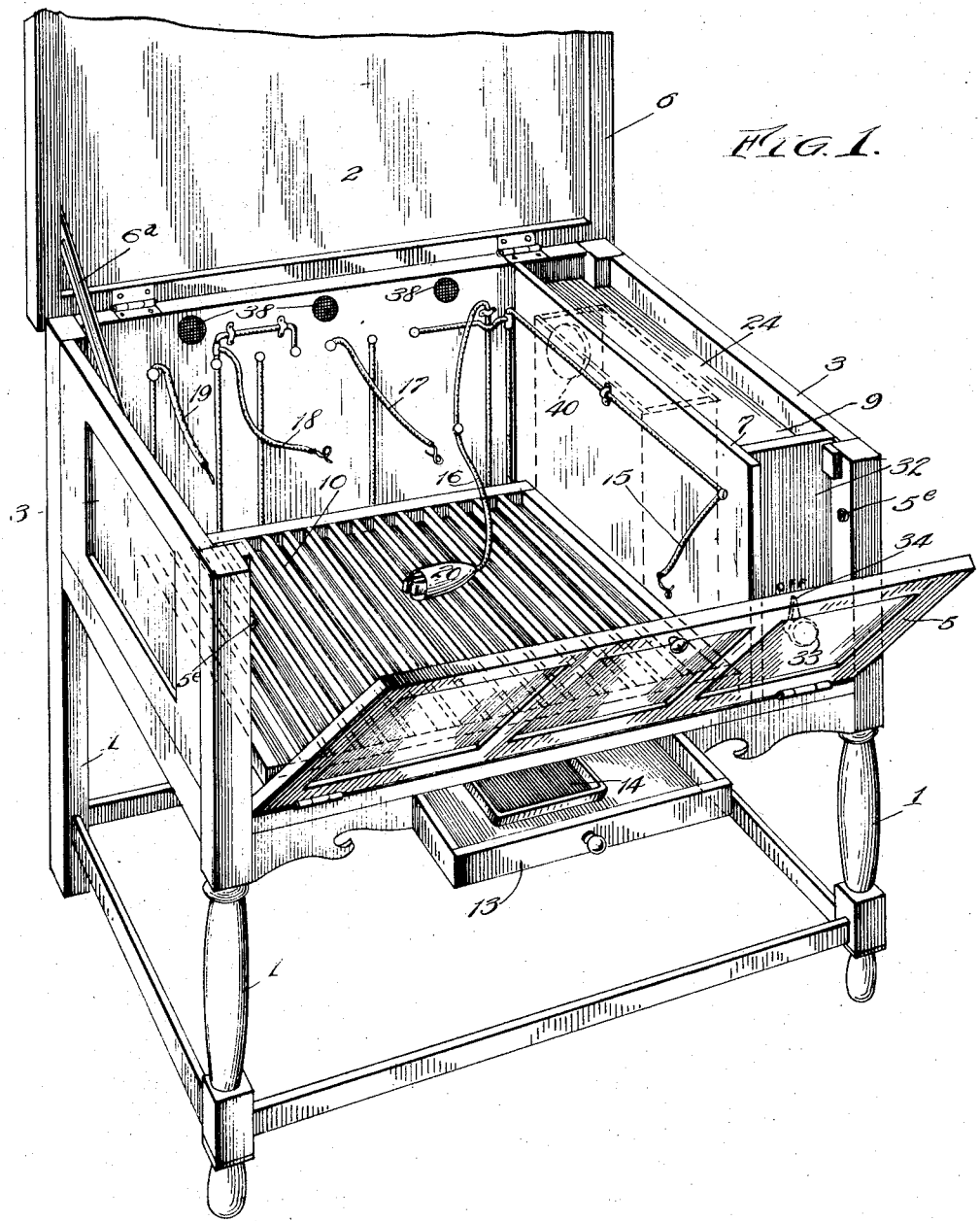

May 26, 1925.　　　　　　　　　　　　　　　　　　1,539,051
J. C. McLEAN
RADIOCABINET
Filed Sept. 23, 1924　　　　2 Sheets-Sheet 1

INVENTOR
John C. McLean.
Thurston Kwis† Hudson
attys.

May 26, 1925.
J. C. McLEAN
RADIOCABINET
Filed Sept. 23, 1924    2 Sheets-Sheet 2
1,539,051
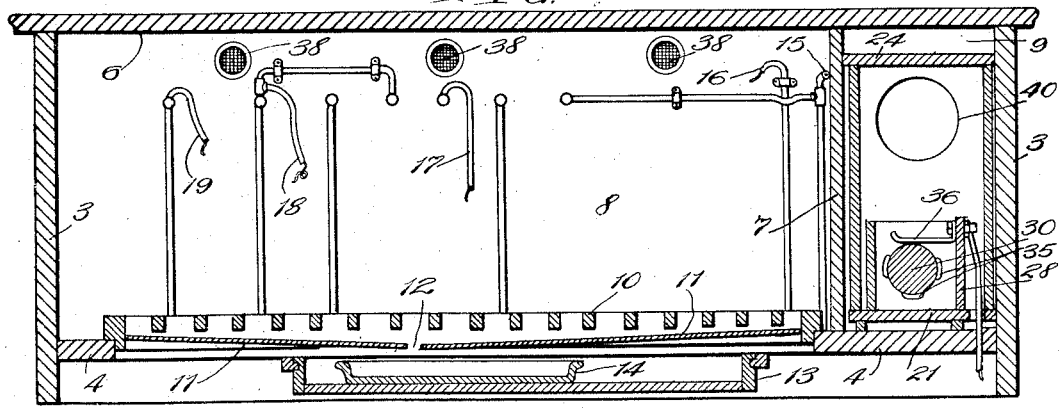
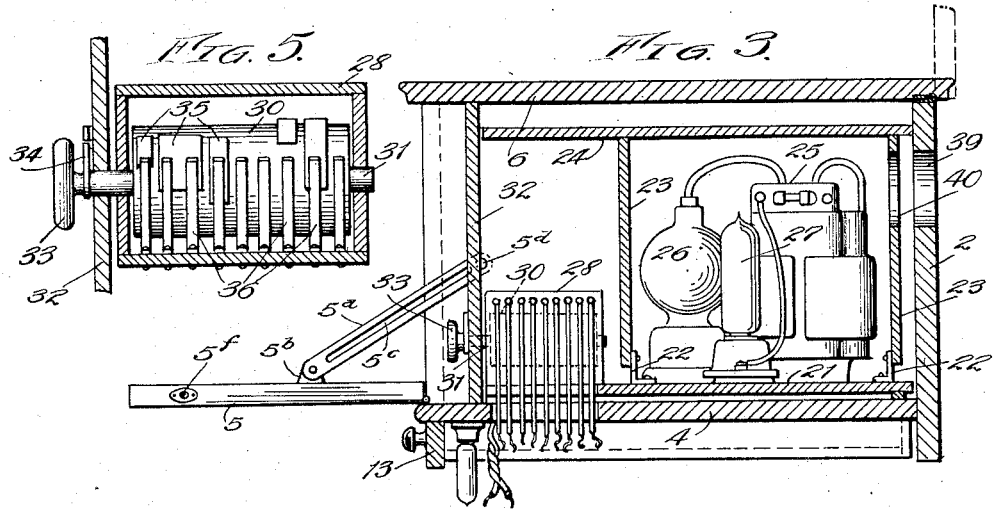
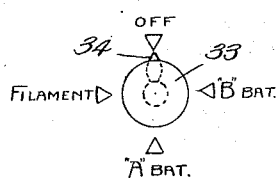
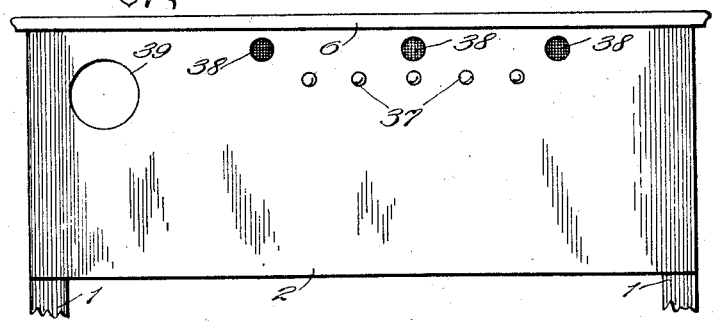
INVENTOR,
John C. McLean Patented May 26, 1925.

1,539,051

UNITED STATES PATENT OFFICE.

JOHN C. McLEAN, OF CLEVELAND, OHIO, ASSIGNOR TO THE M & M COMPANY, OF CLEVELAND, OHIO, A CORPORATION OF OHIO.

RADIOCABINET.

Application filed September 23, 1924. Serial No. 739,322.

*To all whom it may concern:*

Be it known that I, JOHN C. MCLEAN, a citizen of the United States, residing at Cleveland, in the county of Cuyahoga and State of Ohio, have invented a certain new and useful Improvement in Radiocabinets, of which the following is a full, clear, and exact description.

This invention relates to radio power cabinets, the principal objects of the invention being to provide a piece of furniture of pleasing appearance which forms a container for the storage batteries and associated elements used in connection with radio receiving sets, which permits easy access to all of the parts mounted therein which eliminates the danger of fire by isolating the battery charging device and controlling switch from the storage batteries, and by throughly ventilating both the battery compartment and the auxiliary compartment containing the charging device and switch and which in addition prevents damage to rugs or floors by acid dripping from the batteries.

A further object is to provide a simple controller or selector switch by means of which the battery connections may be set for charging the individual batteries or for delivering current to the receiving set, the switch being enclosed in a fire proof housing so that there is no danger of ignition of any gases issuing from the batteries. In addition the cabinet is so constructed that the batteries may be quickly and easily removed or inserted therein and all wiring is concealed within the cabinet.

With the above and other objects in view, the invention may be said to comprise the device as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which Fig. 1 is a perspective view of the cabinet open to show the interior compartments; Fig. 2 is a longitudinal vertical section through the cabinet; Fig. 3 is a transverse vertical section through the cabinet; Fig. 4 is a rear elevation of the cabinet; Fig. 5 is a sectional view showing the controller switch and its casing; Fig. 6 is a diagrammatic view showing the handle by which the controller switch is operated and the indicator associated therewith.

Referring to the accompanying drawings, the cabinet is in the form of a table with a container beneath the top thereof, the table having supporting legs 1 at the corners thereof, a back panel 2 rigidly secured between the rear legs and end panels 3 rigidly secured between the upper ends of the end legs. A bottom member 4 of the container is rigidly secured within the panels 2 and 3 adjacent the lower edges thereof. The front of the container is formed by a panel 5 which is hinged at its lower edge to the bottom 4 and is adapted to be moved from its closed position between the front legs 1 to a horizontal position such as shown in Fig. 3. The pivotal movement of the panel 5 is limited by means of a link $5^a$ which is pivoted at its outer end to a bracket $5^b$ secured to the inner side of the panel 5, the link $5^a$ having a longitudinal slot $5^c$ which receives a pin $5^d$ projecting inwardly from one of the end walls 3. The panel 5 is releasably retained in its closed position by means of spring pressed latch pins $5^e$ mounted in front posts 1 and projecting inwardly therefrom, the spring pins $5^e$ engaging with recessed plates $5^f$ secured to the edges of the panel 5. The cover 6 of the container which forms the top of the table is hinged to the upper edge of the rear panel 2 and is adapted to be moved from its closed position to a vertical position as shown in Fig. 1, the movement of the cover or top 6 being limited by a link $6^a$ similar to the link $5^a$ above described. The container or housing formed beneath the top of the table is divided into two compartments by means of a transverse partition 7 adjacent one end of the housing which is rigidly secured to the rear and bottom walls and extends from the rear wall to the front panel, the front panel being in engagement therewith when in closed position. The partition 7 divides the housing into a main battery receiving compartment 8 and a narrow auxiliary compartment 9 adapted to receive the rectifier and controller switch as will be hereinafter explained.

A portion of the bottom 4 is cut away within the compartment 8 and the compartment 8 has a false bottom consisting of a grid 10 forming a support for the storage batteries and oppositely inclined drip plates 11 which extend from opposite ends of the grid beneath the same, being inclined downwardly toward their inner ends which are spaced apart to form a slot 12 through which any liquid dripping from the batteries is discharged. Mounted beneath the bottom 4 is a drawer 13 which is adapted to receive a drip pan 14 which receives any drippings discharged through the slot 12. The drip pan 14 preferably contains a strong alkali to neutralize any acids which may drip from the batteries. The grid 10 and the plates 11 may be formed of acid proof material, may be coated with acid proof paint or otherwise treated to render them acid proof.

The wiring by which the batteries are connected to the receiving set, to the rectifier and to the controlling switch are all mounted upon the interior of the housing, the flexible wire ends 15 and 16 being provided for attachment to the A battery and the wire ends 17, 18 and 19 being provided for attachment to the B battery and each of these terminals being provided with a suitable clip such as 20 for attachment to the battery posts.

Secured in the auxiliary compartment 9 above the bottom thereof is a board 21 of fire-proof material such as asbestos composition and upon the upper side of this board are attached angle clips 22 which form supports for the side walls 23 of the rectifier casing, the walls 23 being spaced from the bottom board 21 to provide ventilating openings, the side walls 23 being also formed of fire-proof material.

The rectifier casing formed by the bottom board 21 and vertical walls 23 is at the rear end of the compartment 9, the forward end of the compartment containing the controller switch. A cover board 24 of fire proof material extends the full length of the compartment 9 and rests upon the upper edges of the walls 23 forming the cover for both the rectifier casing and the switch compartment. Mounted upon the bottom board 21 within the walls 23 is the battery charger which comprises a rectifier 25 and bulbs 26 and 27, the rectifier being employed for changing the batteries from a source of alternating current.

In the front end of the compartment 9 upon th fire-proof board 21 is mounted the switch casing 28 within which is mounted the selector or controller switch which comprises a drum 30 mounted upon a shaft 31, the forward end of which extends through the front wall 32 of the compartment 9 which is removably secured between the end wall 3 and partition 7 inwardly of the panel 5, the projecting end of the shaft 31 having a knob 33 which carries a pointer 34 which cooperates with suitable indicators on the outer side of the wall 32 to indicate the setting of the switch. The drum 30 is of insulating material and has mounted upon different portions of the periphery thereof arcuate contact strips 35 which cooperate with spring strips 36 carried by the casing 28. The spring strips 36 are connected to the various leads to the batteries to the rectifier and to the receiving set and the contact strip 35 on the drum are so arranged as to establish the connections indicated by the pointer 34 associated with the indicater dial on the outer side of the wall 32. A series of terminals 37 project through the rear wall of the cabinet and these terminals are connected to the various battery leads and are adapted to receive the conductors leading to the receiving set which is preferably mounted upon the top 6 of the table, the various terminals 37 being suitably indicated upon the back of the cabinet to facilitate the attachment of the conductors leading to the receiving set. To provide for ventilation of the battery compartment 8, a series of screened openings 38 are formed in the rear wall 2 adjacent the upper ends thereof and to provide for the ventilation of the auxiliary compartment 9 a large opening 39 is formed in the rear wall 2 at the rear end of the compartment 9, communication being established with the interior of the fire proof switch and rectifier casings through an opening 40 in the rear wall 23 of the rectifier casing which registers with the opening 39. The drawer 13 is spaced below the drip plates 11 so that there is a free passage for air over the top on the drawer and to the slot 12 into the compartment 8 and any gases which form within the compartment 8 are quickly carried away through the openings 38 of the top of the compartment. In the auxiliary compartment 9 the air may pass beneath the lower edges of the walls 23 around the charging apparatus and out through the openings 40 and 39 adjacent the top of the compartment.

Having described my invention, I claim:

1. A radio power cabinet comprising a battery compartment having fixed back and end walls, a rectifier and switch compartment at one end of said battery compartment, a top hinged to the rear wall and covering both said compartments and a hinged front panel forming the front wall of said compartment, wiring upon the interior of the cabinet connecting the batteries, switch and rectifier and terminals upon the exterior of the cabinet adapted to receive conductors leading to a radio receiving set.

2. A radio power cabinet comprising a battery compartment having fixed back and end walls, a hinged top for said compartment, a hinged panel forming the front wall of said compartment, a slanting bottom for said compartment having a discharge opening for drippings, a battery supporting grid above the bottom of said compartment and a drip pan supported beneath said bottom.

3. A radio power cabinet comprising a battery compartment having fixed back and end walls, a hinged top for said compartment, a hinged panel forming the front wall of said compartment, a battery supporting grid in said compartment, a drawer beneath said grid adapted to contain a drip pan, and means between the grid and drawer for directing drippings from the batteries into said drawer.

4. A radio power cabinet comprising a rectangular mechanism enclosing housing having a partition adjacent one end forming a narrow auxiliary compartment and a main compartment adapted to receive the battery, a fire proof housing within said auxiliary compartment, a rectifier within said housing, a controller switch mounted within the auxiliary compartment outside the housing and having an operating handle extending to the outside of said compartment, wiring within said compartment for connecting the batteries to the rectifier and to said controlling switch, and terminals extending to the outside of said cabinet for receiving the conductors leading to a radio receiving set.

5. A radio power cabinet comprising a table having supporting legs at the corners thereof, a mechanism enclosing housing secured to the upper ends of said legs, and a top hinged to the rear wall of said housing and forming the top of the table, a panel extending between the front legs and hinged along its lower edge, said panel forming the front wall of said housing, a portion adjacent one end of said housing dividing the same into a main storage battery compartment and a narrow rectifier and switch compartment at one end of the housing, a battery supporting grid in said main compartment, a drawer beneath said compartment adapted to contain a drip pan, means between the drawer and grid for directing liquid to said drawer, a fire proof container within said narrow compartment, a rectifier in said container, a controller switch within the narrow compartment, and wiring within the container for connecting the batteries to the rectifier and switch, said compartments being provided with ventilating openings adjacent the top thereof.

In testimony whereof, I hereunto affix my signature.

JOHN C. McLEAN.